United States Patent [19]
Estruch

[11] Patent Number: 6,010,035
[45] Date of Patent: Jan. 4, 2000

[54] DISPENSER FOR PARTICULATE MATERIAL

[75] Inventor: Vicente Escriva Estruch, Beniarjo, Spain

[73] Assignee: Sencotel. S.L., Beniarjo, Spain

[21] Appl. No.: 09/002,921

[22] Filed: Jan. 5, 1998

Related U.S. Application Data

[63] Continuation of application No. 29/080,779, Dec. 18, 1997.

[30] Foreign Application Priority Data

Jun. 18, 1997 [ES] Spain ................................. 9701691 U

[51] Int. Cl.⁷ ..................................................... B67D 5/52
[52] U.S. Cl. .......................... 222/142; 222/146.2; 62/304; 62/342
[58] Field of Search ................................ 222/142, 146.2, 222/241, 413; 62/304, 343, 306

[56] References Cited

U.S. PATENT DOCUMENTS

| | | | |
|---|---|---|---|
| 3,656,316 | 4/1972 | Stock ........................................ | 62/306 |
| 3,803,870 | 4/1974 | Conz ........................................ | 62/342 |
| 4,201,558 | 5/1980 | Schwitters et al. ....................... | 62/342 |
| 5,316,195 | 5/1994 | Moksnes et al. ..................... | 222/146.1 |

*Primary Examiner*—Philippe Derakshani
*Attorney, Agent, or Firm*—Henderson & Sturm

[57] ABSTRACT

An improved granulator-dispenser apparatus including: an evaporator having a hollow, semicylindrical shell with a casing for an expanding refrigerating gas; a rear bracket fastened to the casing for housing a motor having a spin axle coupled to a transmission shaft provided with an arch-shaped blade for scraping an inside wall of the evaporator and pushing forward granulated product; a spiral scraper for scraping an outside wall of the evaporator and for mixing and conveying granulated product toward a discharge orifice, wherein the spiral scraper includes turns and spacers between the turns, and the spacers include a rear spacer having a blade for removing granulated product from a rear section of the at least one reservoir, and preventing an accumulation of granulated product and wherein the spiral scraper includes a front blade for conveying granulated product to a discharge orifice of the nozzle; preferably wherein the apparatus includes at least one reservoir comprising a front end with a nozzle, wherein said nozzle comprises a horizontal, cylindrical shell having an inside wall to which is mounted a rotatable drum having a semi-cylindrical offset having sealing gaskets and end lugs centered on respective extremities by means of respective springs, wherein the end lugs enter into openings provided in lateral, flexible lugs that extend upward to link to each other forming a lever that, when actuated, releases pressure of said springs, causing the drum to rotate and convey granulated product to said nozzle.

12 Claims, 4 Drawing Sheets

DISPENSER FOR PARTICULATE MATERIAL

CROSS-REFERENCE TO RELATED APPLICATIONS

This is a continuation of co-pending application Ser. No. 29/080,779, filed on Dec. 18, 1977, entitled *Dispenser for Particulate Material*, the disclosure of which in its entirety is incorporated by reference thereto herein.

This application claims priority under 35 U.S.C. 119 of Spanish Industrial Model No. U 9701,691, filed Jun. 18, 1997.

STATEMENT REGARDING FEDERALLY SPONSORED RESEARCH OR DEVELOPMENT

Not applicable.

AUTHORIZATION PURSUANT TO 37 C.F.R. § 1.71(d)(e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is directed to dispensers, particularly granulator dispensers or dispensers for particulate material, and more particularly to dispensers for granulated products, such as chilled, iced, or frozen products, for example ice cream, frozen yogurt, frozen custard, sherbert, sorbet, and the like.

2. Description of the Related Art

At the present time, several type of granulators are on the market that make ice starting from a liquid or a drink, such as lemonade, coffee or other beverages, to form some sort of more or less pasty mass. The mass is held in such state by means of an evaporator that removes heat and supplies necessary coldness.

Such granulators include blades that stir this mass so that it would not completely freeze thus preventing the formation of excessively large pieces of ice.

The spindle of these blades is usually vertically mounted, which normally requires a product-containing reservoir having a large volume and height, inside of which must be installed the evaporator and the blades.

This disadvantage was remedied with a horizontal arrangement of the spindle of the blades, whereby it was possible to considerably reduce the overall volume of the machine.

However, another drawback continued by virtue of the fact that two types of blades were needed: namely, one type for the stirring itself and the other for the scraping on the surface of the evaporator to prevent the ice from accumulating around the evaporator.

In addition to a lower useful capacity of the reservoir, this meant a coupling of both blades so that they would carry out a combined movement, or the use of two independent drive elements for the different rotational movements of the blades.

This disadvantage was solved by Spanish Patent No. 9100345 that is directed to a granulator that incorporated the previously mentioned spindle in a horizontal direction, and included one only spiral-shaped scraper encircling the evaporator, so that it simultaneously carried out the above-mentioned stirring and scraping functions. Furthermore, by means of a push button, the configuration of the granulator of the patent determines the movement of the granulated chilled, iced, or frozen product towards a discharge nozzle.

In spite of the obvious advantages brought forth by Spanish Patent No. 9100345, this patent is still open to incorporate certain improvements, such as, for example, a better use of the space in the reservoirs, a better treatment of the granulated iced product, and a considerably simpler construction.

SUMMARY OF THE INVENTION

In order to achieve the objectives and remedy the disadvantages set forth herein, the present invention comprises an improved granulator-dispenser, or dispenser for granulated material, of such type that it comprises a base or lower part in which are housed components, such as the condenser, the compressor, and the motor-ventilating fan. On this base are mounted at least one and preferably a plurality of reservoirs, each of which comprises a discharge nozzle for the granulated product, while under each of the nozzles, and in the lower part of the base, are included drip trays to collect the product that may spill when the product is being served.

Inside of each reservoir is installed a horizontal evaporator comprising a semi-cylindrical, hollow shell constituting a casing inside of which expands a refrigerating gas, preferably wherein the evaporator is attached to a rear bracket that is fastened to a casing that houses a motor.

In the center of the the bracket, that is attached to the evaporator, are provided coupling elements between the pertinent motor arbor and a transmission shaft provided with an arch-shaped blade that scrapes the inside wall of the evaporator, pushing forward the granulated product.

Also provided is a spiral scraper that scrapes the outside wall of the evaporator conveying the granulated product towards the discharge nozzle. This spiral scraper rotates in the same direction as the arch-shaped blade and is provided with some spacers between the turns that ensure its stiffness. The spacers include a rear spacer that comprises a rear blade that removes the granulated product from the rear part of the reservoir, preventing the accumulation of granulated product. The spiral scraper has in its front section a front blade that conveys the granulated product toward the discharge nozzle. The spiral scraper also has a cylindrical end cap, that is coupled to the front end of the transmission shaft, receiving movement from the transmission shaft.

The nozzle comprises of a horizontal, cylindrical shell having an inside wall to which is mounted a rotatable drum that presents transversely a semicylindrical offset having sealing gaskets and end lugs by means of springs. The end lugs enter into openings provided in lateral lugs that extend upward where they are joined to each other forming a lever which, in its position of rest, is kept in an approximately vertical position. Thus, the springs cause the drum to keep the nozzle in a closed position while, by moving this lever downward, at a certain angle the pressure of these springs is released so that the drum rotates. Accordingly, when the semicylindrical offset coincides with the pertinent opening of the nozzle, it produces the discharge of granulated product by virtue of the mentioned semicylindrical offset.

The previously mentioned lateral lugs present adequate flexibility with respect to the lever, so that they can separate from the drum and allow its removal from the nozzle, together with its seals and springs, to facilitate necessary cleaning operations.

A suitable device for this purpose of innovative design and function is disclosed in Design patent application U.S. Ser. No. 29/080,779 filed Dec. 18, 1997 entitled *DISPENSER FOR PARTICULATE MATERIAL*, the disclosure of which, including the drawings, is incorporated in its entirety by reference thereto herein.

Thus, by means of the present invention it is possible to obtain a granulator-dispenser or dispenser for granulated material whose active components occupy less space while, concomitantly, they continue having substantially the same cooling surface since, unlike the current granulators, said granulator-dispenser makes use of the outside and inside walls of the evaporator.

The present invention provides a better treatment of the granulated product because of the special arrangement of the evaporator, of the arch-shaped blade, and the spiral scraper; it also simplifies construction by virtue of the design of its components and their simple assembly.

An object of the present invention as disclosed and claimed in this patent application is an improved dispenser for granulated material, the aim of which consists in providing for the processing and the automated holding of granulated products, particularly chilled, iced, or frozen products, as well as the dispensing of such products, with improved characteristics of the existing devices of such type.

The invention is preferably used in public establishments, such as bars, restaurants, ice cream parlors, bars, cocktail lounges and the like, where chilled, iced, and frozen products are made and served although its use in private homes or in any other place cannot be ruled out.

The improvements of the state of the art are fundamentally related to the design of the evaporator, to the stirring and scraping elements, to the dispensing element, and to the design of the reservoir.

To supplement the below description and with the aim of providing a better understanding of its characteristics, attached to these specifications is a set of drawings in which the illustrations present by way of example, but not in a limiting manner, the most significant details of the invention.

DETAILED DESCRIPTION OF THE INVENTION

Figure 1:
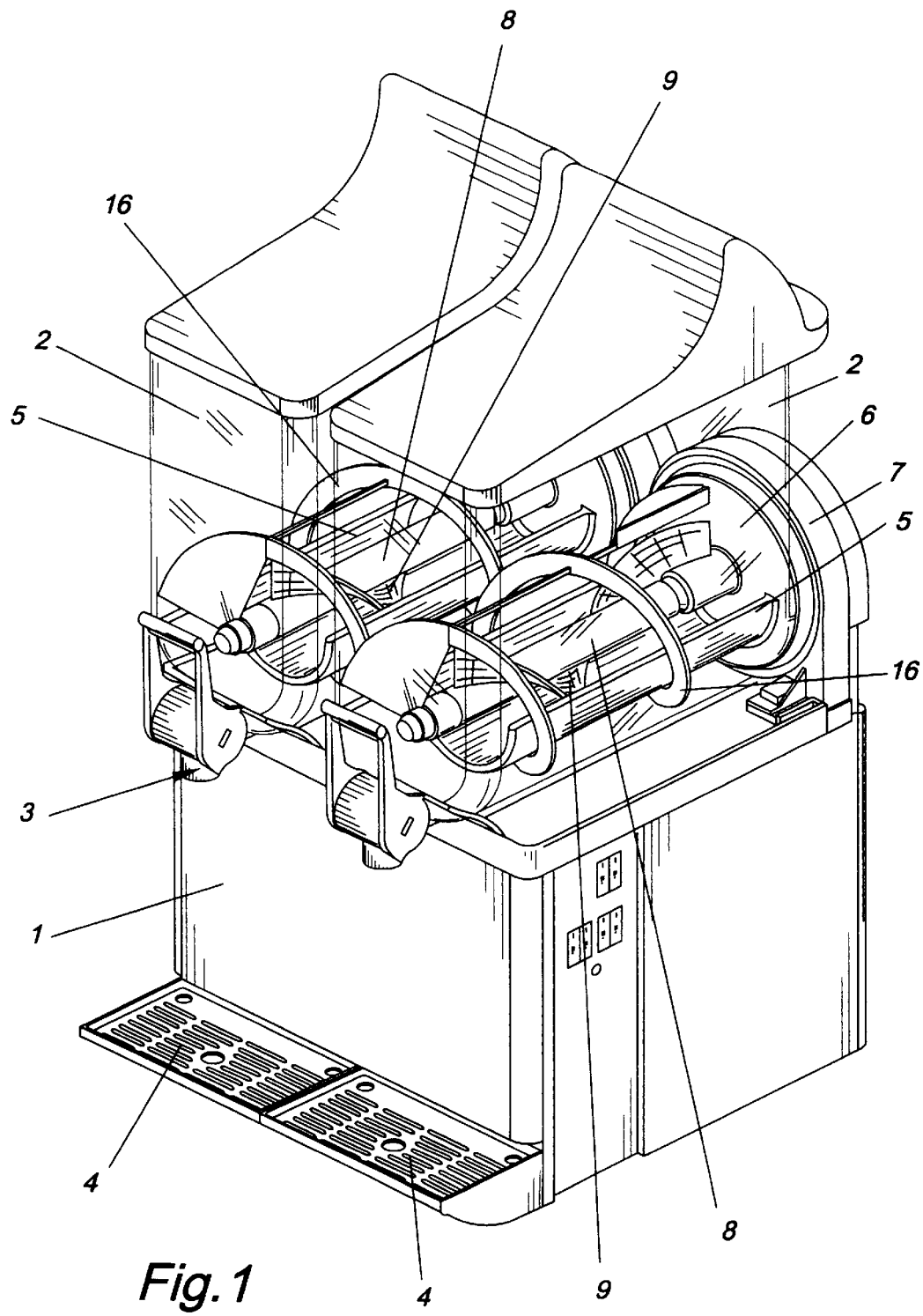
FIG. 1 shows a perspective view of an embodiment of the granulator-dispenser or dispenser for granulated material in accordance with the present invention.
Figure 2:
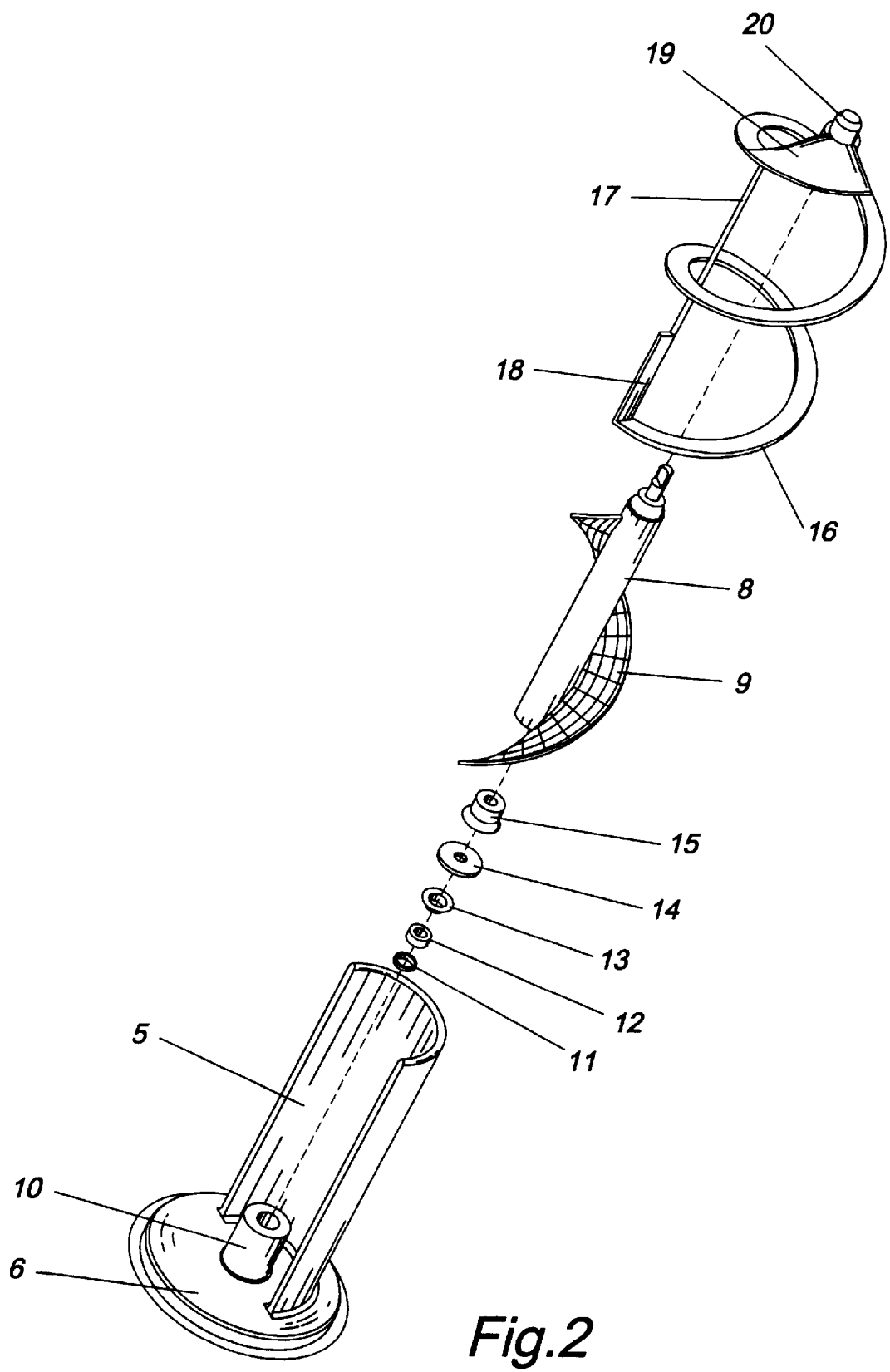
FIG. 2 shows a perspective exploded view of the evaporator and its bracket, the transmission shaft with its arch-shaped blade, the spiral scraper, and the coupling elements between the transmission shaft and the motor arbor.

The present invention intended to be claimed is described herein in detail with respect to the above-mentioned illustrations and in accordance with the herein used reference numbering, which illustrations depict an advantageous but not limiting embodiment of an improved granulator-dispenser according to the present invention. As used herein granulator-dispenser and granulator apparatus are meant to include apparatus which chill or freeze liquid material into a product containing ice crystals or granules, also referred to herein as granulated material.

The apparatus of the present invention includes a lower part 1 in which are housed conventional components, such as the compressor, the motor-ventilating fan, and the like, and on top of which are provided at least one reservoir, preferably a plurality of reservoirs, and most preferably two reservoirs 2 of like characteristics that enable to simultaneously process two different granulated iced or frozen products.

As used herein granulated material is meant to include any and all material which has been produced into a slush or cream containing ice crystals or granules. Such material includes but is not limited to alcoholic and non-alcoholic beverages which have been chilled or frozen into slush; sherbets, sorbets and other ices which are often fruit-flavored; ice cream, frozen custard, and frozen yogurt.

On the front of each reservoir 2 is provided a nozzle 3 for dispensing. Under each reservoir there is provided a drip tray 4 for collecting product that may spill as it is served. Each reservoir 2 presents an ample transparent area, inside of which can be seen a horizontally arranged evaporator 5, that is comprised of a hollow, semicylindrical shell constituting a casing inside of which expands a refrigerating gas.

This evaporator 5 is welded or otherwise fastened on its rear to a bracket 6 that is affixed to a casing 7 that houses a motor (not shown) whose spin axle is coupled to a transmission shaft 8 provided with an arch-shaped blade 9 that scrapes the inside wall of the evaporator, pushing forward the granulated chilled, iced, or frozen product.

The coupling elements between the motor arbor and the transmission shaft 8 comprise a bushing 10 which is illustrated as forming part of the bracket 6, a retainer 11, a bushing 12, a sealing gasket 13, a friction bushing 14, and a sealing cup 15.

The apparatus of the present invention is also provided with a spiral scraper 16 that scrapes the outside wall of the evaporator 5, mixing and conveying the granulated chilled, iced, or frozen product to the discharge nozzle 3.

The spiral scraper 16 presents, between its turns, spacers 17 that ensure its stiffness, with the special feature that the rear spacer is provided with a blade 18 that removes the granulated chilled, iced, or frozen product from the rear section of the reservoir, thus preventing an accumulation of the product.

This spiral scraper 16 is provided on its front with a frontal blade 19 that conveys the granulated chilled, iced, or frozen product to the discharge orifice of nozzle 3. The spiral scraper is also provided with a cylindrical cap 20 that is coupled to the front at the extremity of the transmission shaft 8 in such a manner that the arch-shaped blade 9 of the latter and the spiral scraper 16 turn in a synchronous manner in the same direction of rotation.

Figure 3:
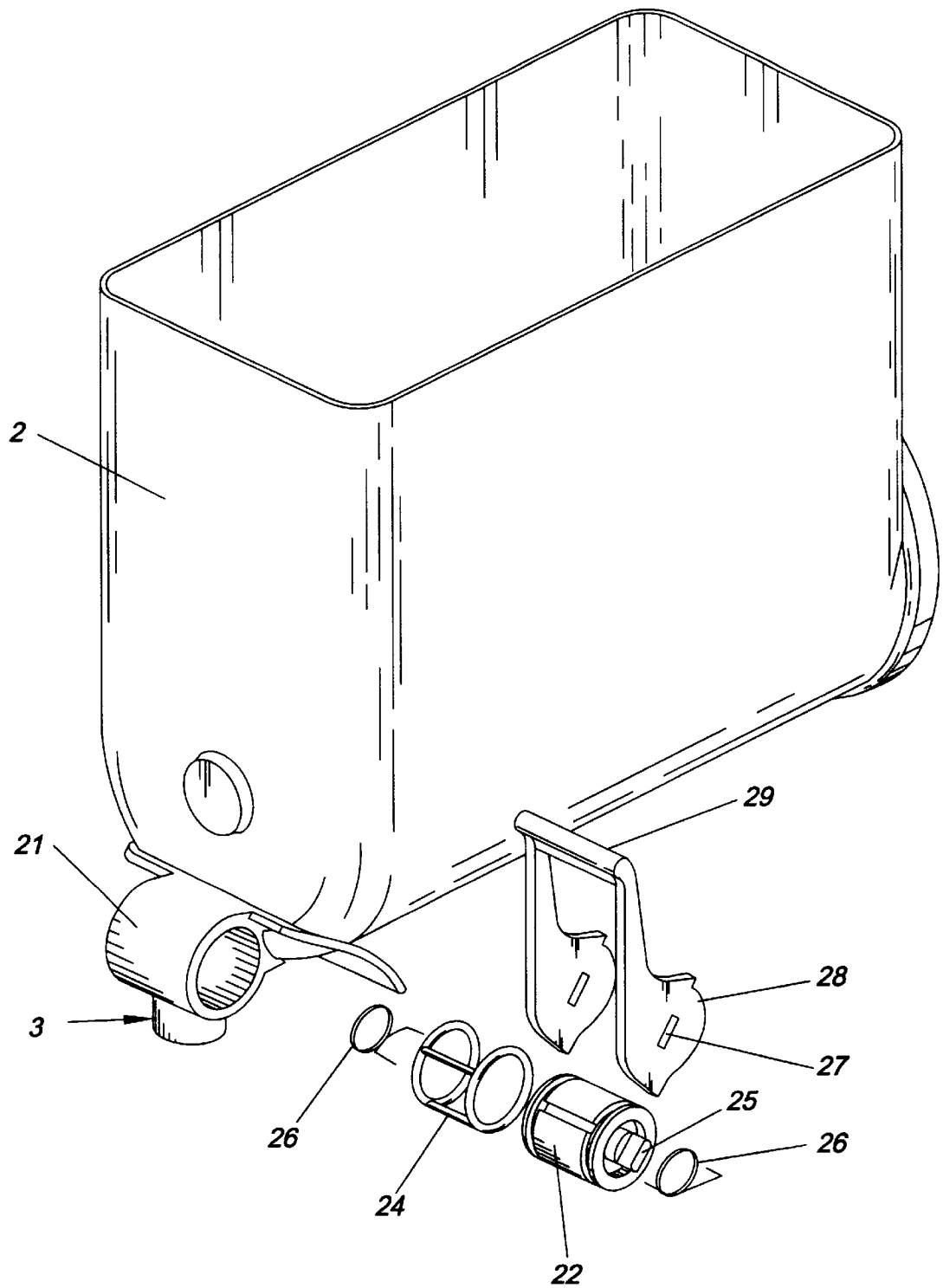
FIG. 3 shows a perspective view of a reservoir in which are shown, in an exploded view, the components that comprise its dispenser.
Figure 4:
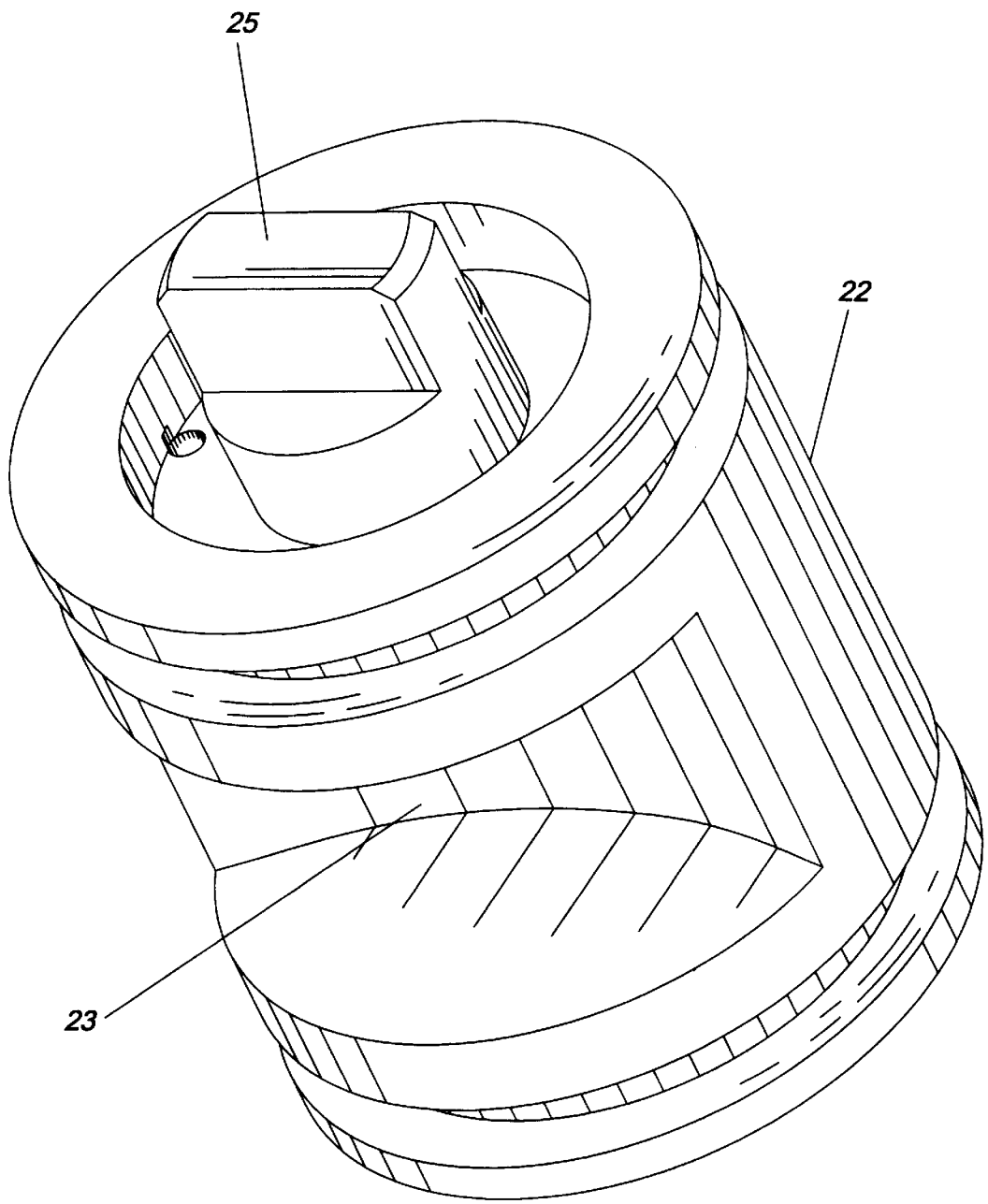
FIG. 4 shows a perspective view of the drum of the nozzle, in which is shown the offset that allows the discharge of the granulated ice, or frozen product.

The nozzle 3, such as shown in FIGS. 3 and 4, comprises a horizontal, cylindrical shell 21 on the inside wall of which it is possible to have rotate a drum 22 that presents transversely a semicylindrical offset 23. The nozzle 3 is provided with sealing gaskets 24 and end lugs 25 centered on their respective extremities by means of respective springs 26. The end lugs 25 enter into openings 27 provided in lateral lugs 28 that extend upward where they are joined to each other, forming a lever 29. Lever 29 when actuated, releases the pressure of these springs 26, causing the drum 22 to rotate thus producing the conveyance of the granulated chilled, iced, or frozen product to the discharge nozzle 3 by virtue of the mentioned semicylindrical offset 23 of the drum 22.

A dispenser for granulated material in accordance with the present invention includes a horizontal, cylindrical body presenting a transverse semicylindrical hollow. The cylindrical body is provided with O-rings around it next to their respective bases, that are joined by means of other two O-rings that are parallel to the curved surfaces of the cylindrical body. Cylindrical hollows are provided on the basis of the cylindrical body from the centers of which protrude respectively also cylindrical ribs that are coplanar to the outside surface of said bases. From such ribs protrude diametrically parallelogrammic lugs in a tilted position, that coincide with some equivalent holes in some disc-shaped elements that are juxtaposed to the pertinent sides of the previously mentioned cylindrical body. The disc-shaped bodies are provided on their periphery with diametrically and diagonally arranged pairs of angular ribs, that extend upwards by means of elongated, trapezoid elements that are joined to each other by means of an arched cross member.

A suitable device for this purpose of innovative design and function is disclosed in Design patent application U.S. Ser. No. 29/080,779 filed Dec. 18, 1997 entitled *DISPENSER FOR PARTICULATE MATERIAL*, the disclosure of which, including the drawings, is incorporated in its entirety by reference thereto herein.

The lateral lugs 28 of the lever 29 present the adequate elasticity to separate from the drum 22 so that the latter is detached for its removal from the nozzle 3, together with its seals 24 and springs 26, thus facilitating the periodic cleaning operation of the nozzle 3.

Although only an exemplary embodiment of the invention has been described in detail above, those skilled in the art will readily appreciate that many modifications are possible eithout materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures

What we claim is:

1. An improved granulator-dispenser apparatus comprising; an evaporator comprising a hollow, semicylindrical shell comprising a casing for an expanding refrigerating gas; a rear bracket fastened to the casing for housing a motor comprising a spin axle coupled to a transmission shaft provided with an arch-shaped blade for scraping an inside wall of the evaporator and pushing forward granulated product; a spiral scraper for scraping an outside wall of the evaporator and for mixing and conveying granulated product toward a discharge orifice.

2. An apparatus in accordance with claim 1, comprising at least one reservoir, wherein said spiral scraper comprises turns and spacers between the turns, said spacers comprising a rear spacer having a blade for removing granulated product from a rear section of the at least one reservoir, and preventing an accumulation of granulated product and wherein said spiral scraper comprises a front blade for conveying granulated product to a discharge orifice of the nozzle.

3. An apparatus in accordance with claim 1 comprising at least one reservoir comprising a front end with a nozzle, wherein said nozzle comprises a horizontal, cylindrical shell having an inside wall to which is mounted a rotatable drum comprising a semicylindrical offset having sealing gaskets and end lugs centered on respective extremities by means of respective springs, said end lugs entering into openings provided in lateral, flexible lugs that extend upward to link to each other forming a lever that, when actuated, releases pressure of said springs, causing the drum to rotate and convey granulated product to said nozzle.

4. An apparatus in accordance with claim 2, wherein at least one reservoir comprises a front end with a nozzle, said nozzle comprises a horizontal, cylindrical shell having an inside wall to which is mounted a rotatable drum comprising a semicylindrical offset having sealing gaskets and end lugs centered on respective extremities by means of respective springs, said end lugs entering into openings provided in lateral, flexible lugs that extend upward to link to each other forming a lever that, when actuated, releases pressure of said springs, causing the drum to rotate and convey granulated product to said nozzle.

5. A process for producing granulated product, said method comprising conveying material to be converted into a granulated product through an evaporator said evaporator comprising a hollow, semicylindrical shell comprising a casing for an expanding refrigerating gas and a transmission shaft connected at one end to a motor and provided with blades for scraping an inside wall of the evaporator and a spiral scraper for scrapping an outside wall of the evaporator for mixing and conveying granulated product to a discharge orifice by rotating the transmission shaft.

6. The process of claim 5, wherein said discharge orifice comprises a nozzle comprising a horizontal cylindrical shell having an inside wall to which is mounted a rotatable drum comprising a semicylindrical offset having sealing gaskets and end lugs centered on respective extremities by means of respective springs, said end lugs entering into lateral flexible lugs that extend upwardly to link to each other forming a lever, said process comprising activating the lever to release pressure of the springs to cause the drum to rotate and convey granulated product to the nozzle.

7. A product produced by the process of claim 5.

8. A product produced by the process of claim 6.

9. An improved granulator-dispenser apparatus comprising at least one reservoir comprising a front area having a nozzle and a drip tray underneath said nozzle for catching product that may spill when dispensed from said nozzle; an evaporator comprising a hollow, semicylindrical shell comprising a casing for an expanding refrigerating gas; a rear bracket fastened to the casing for housing a motor comprising a spin axle coupled to a transmission shaft provided with an arch-shaped blade for scraping an inside wall of the evaporator and pushing forward granulated product; a spiral scraper for scraping an outside wall of the evaporator and for mixing and conveying granulated product toward a discharge orifice of the nozzle, wherein said spiral scraper comprises, at its frontal extremity, a cylindrical cap for coupling to a corresponding front end of the transmission shaft.

10. An apparatus in accordance with claim 9, wherein said spiral scraper comprises turns and spacers between the turns, said spacers comprising a rear spacer having a blade for removing granulated product from a rear section of the at least one reservoir, and preventing an accumulation of granulated product and wherein said spiral scraper comprises a front blade for conveying granulated product to a discharge orifice of the nozzle.

11. An apparatus in accordance with claim 9, wherein said nozzle comprises a horizontal, cylindrical shell having an inside wall to which is mounted a rotatable drum comprising a semicylindrical offset having sealing gaskets and end lugs centered on respective extremities by means of respective springs, said end lugs entering into openings provided in lateral, flexible lugs that extend upward to link to each other forming a lever that, when actuated, releases pressure of said springs, causing the drum to rotate and convey granulated product to said nozzle.

12. An apparatus in accordance with claim 10, wherein said nozzle comprises a horizontal, cylindrical shell having an inside wall to which is mounted a rotatable drum comprising a semicylindrical offset having sealing gaskets and end lugs centered on respective extremities by means of respective springs, said end lugs entering into openings provided in lateral, flexible lugs that extend upward to link to each other forming a lever that, when actuated, releases pressure of said springs, causing the drum to rotate and convey granulated product to said nozzle.

* * * * *